Patented Oct. 29, 1929

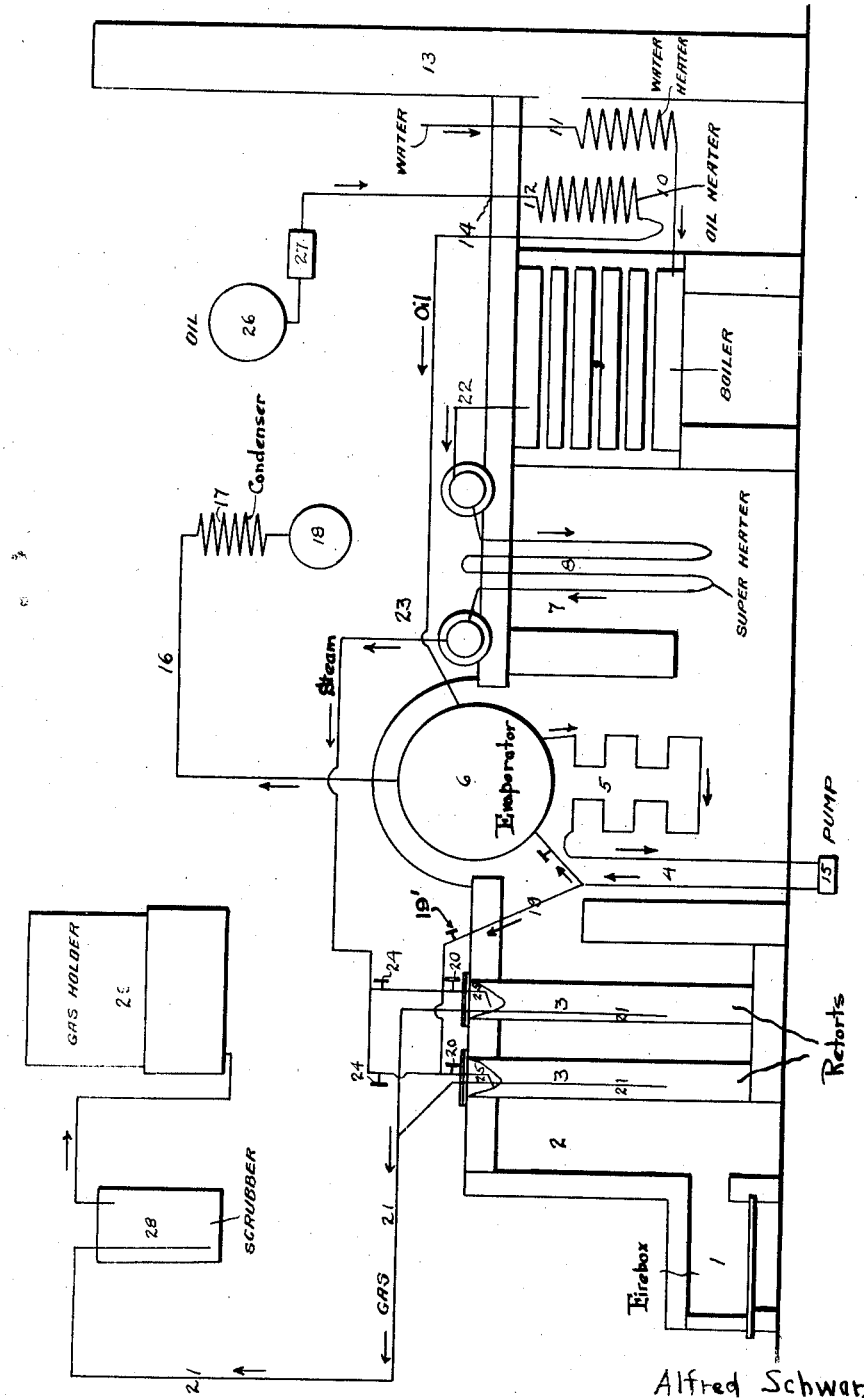

1,733,135

UNITED STATES PATENT OFFICE

ALFRED SCHWARZ, OF MONTCLAIR, NEW JERSEY

COMBINED PROCESS OF DISTILLING, CRACKING, AND GAS MAKING, AND APPARATUS THEREFOR

Application filed January 5, 1927. Serial No. 159,093.

This invention relates to a method and apparatus for complete and continuous conversion of heavy hydrocarbon oils into light oils and gases, without the deposition of permanent residues within the apparatus and without the formation of undesirable by-products. The invention aims to accomplish the above with a maximum efficiency of heat employed in the process.

The commercial utilization of petroleum oils as fuels demands more and more that the fuel should be very fluid or gaseous, as heavy oils are undesirable for use in oil burners or internal combustion engines.

When oil is heated above its normal boiling point, decomposition, which is commonly called cracking, may result. Such cracking results in the concentration of hydrogen into lighter fractions and carbon into heavier fractions, and takes place at a speed proportional to the heat input. If the heat input is relatively slow, tarry residues are formed, whereas if the heat input is relatively fast, a fixed carbon residue is precipitated on the heating surfaces. It is therefore one of the objects of this invention to cause cracking by a relatively rapid heat input, and to take care of the segregated carbon through inter-reaction with superheated steam, thereby forming water gas, according to the reaction of

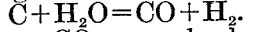
$$C + H_2O = CO + H_2.$$

Of course some $CO_2$ may also be formed.

It is a further object of my invention to decompose heavy hydrocarbon oils by heating either under atmospheric or superatmospheric pressure thereby producing light oils suitable for motor fuel and heavy carbon-containing residues and utilizing such residues for the production of water gas.

A further object of my invention resides in the conversion of heavy hydrocarbons into light oils and combustible gases with maximum heat economy and efficiency of operation.

Generally speaking, oil refining operations as conducted in modern refining plants involve too much fuel expenditure due to the fact that oil is heated and fractionated by fractional condensation and the cold fractions are re-treated by renewed heating, etc. Heavy residues, more or less suitable for use in oil burners, are distributed among the users of fuel and the overall efficiency in the utilization of the oil is poor.

My process is designed to operate under the principle of counter flow. The oil proceeds through the system in heat conductive relation to a heating fluid such as furnace gases, moving through the system in the opposite direction. In consequence, the oil first encounters the residual heat of the flue gases which are about to be discharged from the system, where light distillates are extracted. The oil from there encounters progressively higher temperatures, passing through a cracking operation, and yielding products of greater value than the raw material at different points during the treatment and increasing the concentration of carbon in the residue. Toward the high temperature end, fixed carbon segregates. During the progress of the treatment described, water is being heated and converted into steam, which is superheated to a temperature high enough to enable its oxygen to react with the fixed carbon, when the two are brought together, thus finally gasifying the residue and producing a mixture of oil and water gas. The amount of carbon segregated however depends on the new compounds formed. It must be remembered that a very high percentage of the oils, sometimes as much as 85% are olefines and if the ultimate gas which is formed contains a high percentage of olefines then a relatively small amount of carbon is segregated because the percentage of hydrogen and carbon in all olefines is the same. Only if other compounds are produced for example paraffins, then carbon is segregated and must be taken care of by oxygen, and it will be hereinafter explained how the heat treatment effects this condition.

It will be observed that such a treatment proceeds at maximum efficiency of the fuel employed in the process. I use the heat at a point of its maximum intensity for the gas making operation, and as the heat is gradually abstracted from the flue gases, operations are performed by the residual heat which are properly proportioned to cause an efficient heat exchange between the heating gases and the material to be heated.

As the treatment of the oil proceeds, carbon is concentrated in the oil and as carbon concentration takes place, successively higher temperatures are required to cause further production of desirable oils, and when the carbon is highly concentrated then oxygen, in the meanwhile prepared from water, is added and carbon monoxide is formed from the carbon and the hydrogen thus set free becomes a desirable constituent of the gas.

The apparatus is so arranged that a sufficient differential is always maintained between the temperature of the flue gases and the temperature of the incoming material to cause an efficient flow of heat in the direction of the material to be treated.

For example, I will enumerate in the following the heat conditions required to cause this treatment:

Assuming the oil and water is received in the apparatus at 60° F., low temperature flue gases may be utilized to heat the water to 212° F., and the oil to about 115° F. thereby adding sufficient sensible heat to prepare both for initial vaporization. Then the latent heat of vaporization is required and the different fractions of oil will successively vaporize and water will be converted into steam. Continuing in the path of the constantly increasing temperature, the oil will gradually reach cracking temperatures where the heat of formation is required for the new liquid compounds. In the meanwhile, the steam is superheated, and at still higher temperature, large quantities of heat are required to supply the heat of formation of fixed hydrocarbon gases and the heat of dissociation of steam. Continuing at still further increased temperatures, the now wholly or partially decomposed water is contacted with incandescent carbon and at this point exothermic reactions, namely those of the formation of carbon dioxide and carbon monoxide commence, and are completed when maximum temperatures are reached. When I speak of carbon and incandescent carbon, I mean finely divided carbon, which may be in colloidal condition, and while it is impossible to establish the exact occurrence, I believe that when the oil is properly atomized by means of the superheated steam the carbon is converted into carbon monoxide and some dioxide without ever accumulating in masses upon the walls of the receptacle. Rather than that, the carbon will be converted into carbon monoxide, etc. at the instant it strikes the wall, where the maximum heat is available.

Speaking now of the ultimate gasification, abruptly contacting oil with incandescent surfaces will yield little or no liquid products of cracking, but will produce tars, lamp black, etc., very undesirable as commercial products and greatly tending to plug up the apparatus to a varying degree, ranging from operating difficulties to complete shutting down of the apparatus. It is impossible to describe every occurrence in a cracking operation because the possibilities of the formation of new products are manifold, but the success of a commercial operation depends upon the gradual absorption of heat by the materials, and the degree of efficiency is governed by the speed of heat interchange.

Two things govern the success and failure of this type of operation. One is the efficiency of heat transfer and the other is the proper adjustment of temperature with respect to the material being treated. Heat control has other effects upon the treatment besides those mentioned above, as the following example will illustrate.

An oil may be composed of a high percentage of the olefine series and a relatively small percentage of the paraffin series. If this oil was treated in the early stages with an excessive heat input only a small percentage of oil suitable for motor fuels could be obtained. A large percentage of tars would be formed, the decomposition of which would require a large amount of steam in order to furnish the necessary oxygen to decompose the carbon and form carbon monoxide. The resulting gas would be a low B. t. u. gas which oftentimes might defeat the purpose of the process. The reason for this is as follows:

The entire olefine series is made up of a percentage of carbon of 85.67, and hydrogen 14.33. If rapidly treated, a large amount of methane, for example, would be produced, which has a carbon content of 75% and a hydrogen content of 25% and a heating value of 10.05 B. t. u. per percent per cu. ft. of gas. It may be readily seen that a large percentage of carbon had to be disposed of and if no carbon accumulation is made, which is not permissable in the apparatus, this carbon has to be converted into carbon monoxide or carbon dioxide which requires a large amount of oxygen, and a proportionate amount of hydrogen is set free. If on the other hand a slow heating is employed a large amount of products of the ethylene series is produced, which has a heating value of 21.5 B. t. u. per percent per cu. ft. and since all olefines are alike in carbon and hydrogen no carbon is set free and no oxygen is used to form carbon monoxide and therefore no hydrogen is set free into the gas.

While the general principle of the formation of gas through the inter-reaction of oil and superheated steam at high temperatures may be well known and simple enough, and when light oils are used results might be obtained at times without a great deal of difficulty, yet, when high percentages of carbon are introduced with heavy oils it is quite difficult to prevent the formation of excessive amounts of lamp black and to obtain economy throughout the operation. Since the economic limits in gas making are rather narrow, improper digestion of the oil might mean the failure of the operation. In some cases it is very necessary to regulate the hydrogen content of the gas. For example, should the gas be used for the production of power in internal combustion engines, a free hydrogen content of over 15% might be undesirable since it will produce the well known "knock" in the engine, which at 25 or 30% hydrogen, or perhaps more, would become so intense that it would be impossible to use the gas for power production in engines.

Heretofore oil was distilled in refineries and the lighter fractions were sold for gas making, whereas I propose to distill or crack the oil in conjunction with the gas making apparatus and use the heavy fractions as the raw material for the gas making. Such a method has a great many advantages. The gas making apparatus can only use very high temperatures, flue gases of low temperatures being useless and are usually allowed to go to waste. On the other hand temperatures for the production of steam and for the distillation of oil are moderate and by proper combination of the various processes employed and by proper heat distribution excellent economies can be accomplished.

The aforesaid can be best described in connection with the accompanying drawing forming part of this application in which the single view constitutes a diagrammatic representation of apparatus for effecting the process.

In the drawing 1 is the firebox from which the combustion gases pass through chamber 2, in which retorts 3 and 3 are located. These retorts are cylinders made of a heat resisting material, such as chrome nickel steel, and in which residue from the distillation or cracking is converted into gas. Chamber 4 contains a bank of tubes 5 and an evaporating tank 6, the combination of 5 and 6 forming an oil still of a type generally used. Chamber 7 contains a steam superheater 8 of well known construction. The gases from chamber 7 pass through fire tubes of the boiler 9 into chamber 10 in which are disposed the feed water heater 11 and the oil pre-heater 12, and from chamber 10 the gases are discharged through the stack 13.

Crude oil or any other suitable oil is drawn from a storage tank 26, by a pump 27 and enters the oil pre-heater 12, leaving same through line 14 and passing into evaporating tank 6, from which it passes in series through the tube 5 and pump 15 back into the evaporating tank 6. Circulating pump 15 causes a circulation from the evaporator 6 through the pipe still 5 and back to the evaporator again.

The oil vapors of the lighter distillates pass from evaporator tank 6 through pipe line 16 into condenser 17 and the condensate is stored in tank 18. A branch line 19, having control valve 19', passes from the pump 15 to the retorts 3 and 3. Control valves 20 and 20 control the flow of oil into the retort. Gas lines 21 take the gas from the retorts 3 and 3 to the gas scrubber 28 and holder 29.

Water is pumped into the water heater 11 and from there into the boiler 9. Steam is taken from the boiler 9 through line 22 into the superheater 8 and emerges from the superheater through line 23 and is passed to the retorts 3—3, entering the same together with the oil thereby spraying the latter but being separately controlled by the valves 24 and 24. An oil and steam nozzle 25 inside of each retort 3—3 sprays the oil on a tangent against the inside of the retort, causing same to travel in a spiral along the inside wall of the retort. The gas lines 21—21 extend through the center of the retort down approximately two thirds of the way in order to prevent undigested oil from passing out with the gas. It will of course be understood that superheated steam need not necessarily be relied upon to spray the heavy residue but the same may be suitably atomized by means of other hot gases under pressure such as water gas, hydrogen, or even oil gas. Superheated steam however is preferred.

It is of course understood that the oil still, 5—6 may be of any other type than the one illustrated. It may be operated as a skimming or topping still, or may be operated as a pressure cracking still, or any method of refining oil may be employed at this point. Where the still 5—6 is operated under superatmospheric pressure in order to effect cracking of the hydrocarbons, light oils normally present in raw material and vaporized before reaching the cracking still may be taken off for condensation before the oil reaches tank 6, the various fractions preferably being taken off at separated points in the course of the oil flow. In the treatment of oils not requiring superatmospheric pressure for cracking, for example, higher members of the olefine series, the still 5—6 may be operated at atmospheric pressure, the newly formed light oils and those normally present in the raw material being removed as vapor through outlet 16. Even a vacuum may be employed if desired.

I have operated a still of the type shown in connection with a reflux column, not shown, whereby the intermediate oils were continually refluxed to the still and in such an operation, of course, a much greater percentage of motor fuel is obtained than when a still is operated merely as a skimming or topping still.

From the foregoing it is believed that the operation is quite clear. The apparatus being brought to operating temperature, the oil to be treated is fed by means of pump 27 and preheated in heater 12 by waste flue gases about to be discharged through stack 13. Water is simultaneously preheated in heater 11. The preheated oil is then conducted to tank 6 and cyclicly circulated from and back to the same through heating tubes 5. The still 5—6 may be operated as a pressure cracking still. The pressure will of course vary with the material being treated, the temperature, the products desired, and other factors. Cracking pressures are well known in the art and form no part of the present invention. The preheated water is vaporized in boiler 9 and superheated in heater 8, both operations being effected by the flue gases utilized for heating retorts 3 and still 5—6. As a result of the treatment in still 5—6, there are formed light condensible hydrocarbons which are removed as vapors through outlet 16 and condensed to oils suitable for motor fuel in condenser 17, the product being collected in 18. As a result of the cracking, there is also formed a heavy hydrocarbon residue containing in chemical combination and in suspension considerable amounts of carbon. This residue is either continuously or intermittently withdrawn from the circulating oil body through pipe 19 and sprayed or atomized together with or by means of the superheated steam into the gas retorts 3. The well known water gas reactions ensue, consuming substantially all of the excess carbon and converting the same into water gas. Free hydrogen passes out with the gas and according to the temperatures employed a number of ethylene series hydrocarbons are formed. Methane and even other paraffin hydrocarbons may be present as well as members of the ethylene and benzole series, etc., and hydrocarbons, as some times made. These specific types of hydrocarbons are to some extent controlled by the temperatures and by the quantity of steam used and by the length of treatment which is a matter of design of the apparatus. The resultant gas is withdrawn through pipes 21 and after scrubbing in any known manner in scrubber 28 is stored in gas holder 29.

As an example of the process, the following is given:

In operating the process I have charged a Mexican crude oil with a gasoline content of approximately 5% and by distilling under reflux at a temperature of 680° F. in the still I have obtained 20% gasoline with an initial boiling point of 125° F. and an end boiling point of 437° F. I have also obtained 32% of gas oil with an initial boiling point of 400° F. and an end point of 650° F. While distillation was going on, the residue was continually charged to the retort and a gas was produced of the following analysis:

Total B. t. u. _____ 816.3
$CO_2$ _____ 4.5
Ill _____ 16.7
$O_2$ _____ 0.6
CO _____ 6.7
$H_2$ _____ 37.1
$CH_4$ _____ 29.5
$N_2$ _____ 4.7

Total _____ 99.8
Total inerts _____ 9.8

A much higher B. t. u. gas is made when a higher grade oil is used, for example, a mid-continent oil gave the following analysis of the gas after light oils had been extracted:

Total B. t. u. _____ 1517.3
$CO_2$ _____ 2.1
Ill _____ 53.9
$O_2$ _____ 0.7
CO _____ 2.7
$H_2$ _____ 11.7
$CH_4$ _____ 25.7
$N_2$ _____ 3.2

Total _____ 100.0
Total inerts _____ 6.0

The temperature maintained in the oil preheater 12 was 200° F. Temperature maintained in the oil stills 5—6 was 680° F. Temperature maintained in the retorts 3—3 was 1350° F. The temperature maintained in the water heater 11 was 180° F.

The boiler was maintained at 80 lb. steam, with ordinary boiler temperature. The superheater was maintained at from 1200° F. to 1400° F.

Approximately ten gallons of oil were required per thousand cu. ft. of gas produced. From this, however, two gallons of motor fuel and three gallons of gas oil were obtained, so that only five gallons of oil were fed to the retorts.

It will be of course understood that the gas after leaving the retorts may be passed through any of the well known absorption systems, such as a straw oil or charcoal absorption plant, thus extracting additional quantities of light oils from the gas.

The invention is by no means limited to the specific conditions herein set forth as various changes and modifications may be made without departing from the spirit of the invention as defined in the appended claims.

Having described my invention, I claim:

1. The process of producing volatile hydrocarbon distillate and gas from crude petroleum oil which comprises passing separate streams of oil and water in confinement in countercurrent flow and out of direct contact with flue gases of constantly increasing temperatures, preheating said stream of oil and converting said water into steam, superheating the stream of steam and vaporizing the oil at points where the flue gases are of sufficient temperatures, removing and condensing vapors of said oil, and reacting on the residual oil with said superheated steam at a point in the flow of said flue gases where the temperature is at a maximum and sufficient to convert a substantial portion of said residual oil into gas.

2. The process of converting crude petroleum oil into light liquid hydrocarbons and gas which comprises maintaining continuous flow of furnace gases past a confined gasifying zone and a confined oil cracking zone in the order of successively decreasing temperatures, preheating in separately confined streams said crude oil and converting water into superheated steam by countercurrent flow through and out of direct contact with said furnace gases after utilization thereof for heating said gasifying and cracking zones, cracking the preheated oil under pressure in said cracking zone, removing and condensing light hydrocarbon vapors formed by said cracking, passing the residual oil from said cracking zone into said gasifying zone, and gasifying said residual oil by increased temperature and reaction thereof with said superheated steam.

3. An apparatus for treating oil comprising within a furnace, a furnace combustion chamber and a series of heating zones connected thereto for receiving hot gases in series from said chamber, a gas retort in the first or hottest of said zones, an oil still in the second of said zones, a steam superheater, a steam boiler, and oil and water preheaters in succeeding heating zones of progressively lower temperature, means for passing water from said water preheater through said boiler and superheater and into said gas retort, means for passing oil from said oil preheater into said oil still, and means for passing residual oil from said still into said gas retort.

4. An apparatus for treating oil, comprising within a furnace, a combustion chamber and a series of heating zones connected thereto for receiving hot gases in series from said chamber, a gas retort, an oil still, a steam superheater, a boiler, and oil and water preheaters arranged within said successive heating zones in accordance with their respective heat requirements, means for passing water from said water preheater through said boiler and superheater into said gas retort, means for passing oil through the oil preheater and into said still, and means for passing residual oil from said still into the gas retort.

ALFRED SCHWARZ.